United States Patent
Wiedemann et al.

(10) Patent No.: US 12,275,818 B2
(45) Date of Patent: Apr. 15, 2025

(54) STEAM-RESISTANT TRANSPARENT POLYAMIDES

(71) Applicant: EMS-CHEMIE AG, Domat/Ems (CH)

(72) Inventors: Thomas Wiedemann, Arlesheim (CH); Etienne Aepli, Domat/Ems (CH)

(73) Assignee: EMS-CHEMIE AG, Domat/Ems (CH)

( * ) Notice: Subject to any disclaimer, the term of this patent is extended or adjusted under 35 U.S.C. 154(b) by 804 days.

(21) Appl. No.: 17/457,309

(22) Filed: Dec. 2, 2021

(65) Prior Publication Data
US 2022/0177649 A1 Jun. 9, 2022

(30) Foreign Application Priority Data
Dec. 4, 2020 (EP) .................... 20211736

(51) Int. Cl.
C08L 77/02 (2006.01)
C08G 69/26 (2006.01)
C08G 69/32 (2006.01)
C08J 3/20 (2006.01)
C08K 5/09 (2006.01)
C08L 77/06 (2006.01)

(52) U.S. Cl.
CPC ........... C08G 69/265 (2013.01); C08G 69/32 (2013.01); C08K 5/09 (2013.01)

(58) Field of Classification Search
CPC ......... C08L 77/02; C08L 77/04; C08L 77/06; C08J 3/20; C08J 3/201; C08J 3/203
USPC .................. 523/100; 524/606, 607
See application file for complete search history.

(56) References Cited

U.S. PATENT DOCUMENTS 5,416,172 A    5/1995  Blondel et al.
2009/0306308 A1  12/2009  Blondel et al.
2013/0041128 A1* 2/2013  Oda .............. C08G 69/36
                                          528/346
2015/0368398 A1* 12/2015  Hoppe ............ C08J 5/04
                                          528/346

FOREIGN PATENT DOCUMENTS

| DE | 26 42 244 C2 | 7/1983 |
| DE | 43 10 970 A1 | 10/1994 |
| EP | 0 055 335 A2 | 7/1982 |
| EP | 0 603 813 A1 | 6/1994 |
| EP | 0 725 100 A1 | 8/1996 |
| EP | 0 725 101 A1 | 8/1996 |
| EP | 1 595 907 A1 | 11/2005 |
| EP | 2 666 803 A1 | 11/2013 |
| WO | 2007/087896 A1 | 8/2007 |

OTHER PUBLICATIONS

European Search Report for Corresponding EP 20 21 1736, dated May 6, 2021.

* cited by examiner

*Primary Examiner* — Michael J Feely
(74) *Attorney, Agent, or Firm* — Sughrue Mion, PLLC

(57) ABSTRACT

A transparent polyamide moulding with high resistance to steam, containing at least one copolyamide with polyamide units AB/AC/D, wherein: (A) is selected as a cycloaliphatic diamine from the group: MACM and PACM; (B) is selected as an aromatic dicarboxylic acid from the group: isophthalic acid (I), naphthalenedicarboxylic acid, and terephthalic acid (T); (C) is selected as an aliphatic dicarboxylic acid from the group: decanedioic acid, undecanedioic acid, dodecanedioic acid, tridecanedioic acid, tetradecanedioic acid, pentadecanedioic acid, hexadecanedioic acid; and (D) is selected as at least one lactam or $\alpha,\omega$-aminocarboxylic acid from the group: laurolactam, undecanolactam, 12-aminododecanoic acid, and 11-aminoundecanoic acid, wherein: the proportions of polyamide units AB are from 30 to 45 mol %, the proportions of polyamide units AC are from 30 to 40 mol %, and the proportions of polyamide units D are from 20 to 32 mol %, and wherein the sum total of polyamide units AB, AC and D is 100 mol %.

29 Claims, 1 Drawing Sheet

STEAM-RESISTANT TRANSPARENT POLYAMIDES

TECHNICAL FIELD

The present invention relates to transparent polyamides based on cycloaliphatic diamine structural units and aromatic dicarboxylic structural units, which feature particular resistance to steam and also good mechanical properties. The invention further relates to processes for preparing such transparent polyamides, to uses of such polyamides and to components made from such polyamides.

PRIOR ART

Transparent amorphous copolyamide moulding compounds and transparent amorphous polyamide moulded articles producible therefrom are known from the prior art. In the field of transparent polyamides, a distinction is made in principle between two polymer types, specifically microcrystalline transparent polyamides on the one hand and amorphous transparent polyamides on the other.

Microcrystalline transparent copolyamide moulding compounds and the use thereof for spectacle frames, apparatus sight glasses and covers, and lamp covers are known for example from DE-A-43 10 970. The polyamides described in said document are prepared from 4,4'-diaminocyclohexylmethane as diamine component and dodecanedioic acid as acid component.

EP-A-1 595 907 describes transparent amorphous polyamides based on cycloaliphatic diamines and a C14 dicarboxylic acid.

EP-A-0 725 101 additionally discloses transparent amorphous polyamides based on cycloaliphatic diamines and a C12 dicarboxylic acid having, inter alia, exceptional stress cracking resistance in most solvents.

Such transparent systems based on cycloaliphatic diamines may also contain aromatic structural units. For example, EP-A-725100 discloses transparent systems of the MACMI/12 type and DE-C-2642244, WO-A-2007/087896 and EP-A-2 666 803 disclose transparent systems of the MACMI/MACMT/12 type, and EP-A-055 335 discloses transparent systems of the PACMI/PACMT/12 type. US-2009/306308 discloses transparent systems of the PACMT/PACM10/12 type or of the PACMT/PACM14/12 type and of the PACMT/MACM14/12 type, each having a high aliphatic content and unsatisfactory thermomechanical properties. U.S. Pat. No. 5,416,172 discloses transparent systems of the MACMI/MACMT/MACM6/12 type.

EP-A-0603813 describes moulded articles made from transparent copolyamides and the transparent copolyamides themselves, formed from long-chain monomers having 9 to 12 carbon atoms and from monomers for semi-aromatic polyamides in random distribution, which even in the conditioned state feature stiffness, strength, high toughness and exceptional solvent stability.

DESCRIPTION OF THE INVENTION

The transparent polyamides mentioned in the introduction possess, depending on formulation, good mechanical properties and good transparency. However, it is found that the transparent polyamide systems known from the prior art exhibit an unsatisfactory resistance to repeated steam exposure. In particular, it is found that the known systems generally form hairline cracks under these conditions and as a result both lose their transparency and experience impaired mechanical properties, and possibly also leaktightness, when such materials are being used to delimit spaces from one another. Accordingly, it is, inter alia, an object of the present invention to provide a transparent polyamide moulding compound which is improved compared to the prior art, especially a transparent moulding compound which is based on cycloaliphatic diamines and aromatic dicarboxylic acids and also further aliphatic structural units, and which displays a high resistance to steam. The components are additionally scratch-resistant and absorb little water, and they have a high chemical stability, which also means, for example when they are exposed to foods or chemicals containing dyes, that they can be readily cleaned without leaving behind stains.

The present invention accordingly provides a polyamide moulding compound according to claim 1, and uses of such a polyamide moulding compound, processes for preparing such polyamide moulding compounds and mouldings produced from said compounds.

Specifically, the present invention relates to a polyamide moulding compound comprising at least one copolyamide. This copolyamide is formed at least from the polyamide units AB/AC/D, as defined below. While further polyamide units may also be present in this copolyamide, preferably only these polyamide units are present. Complex structures may be formed, especially when, for example, two different systems are selected for (A) as defined below.

If, for example, two different systems A' and A" are selected for (A), the polyamide may then be written as A'B/A"C/D for short, although on closer inspection this is a system having the following polyamide units: A'B/A'C/A"B/A"C/D.

The structural units of the copolyamide formed at least from the polyamide units AB/AC/D are defined as follows:
(A) is selected as at least one cycloaliphatic diamine from the group: bis(4-amino-3-methylcyclohexyl)methane (MACM) and bis(4-aminocyclohexyl)methane (PACM).
(B) is selected as at least one aromatic dicarboxylic acid from the group: isophthalic acid (I), naphthalenedicarboxylic acid, and terephthalic acid (T).
(C) is selected as at least one aliphatic dicarboxylic acid from the group: decanedioic acid, undecanedioic acid, dodecanedioic acid, tridecanedioic acid, tetradecanedioic acid, pentadecanedioic acid, hexadecanedioic acid.
(D) is selected as at least one lactam or one α,ω-aminocarboxylic acid from the group: laurolactam (LC 12), undecanolactam (LC 11), 12-aminododecanoic acid, and 11-aminoundecanoic acid.

The following stipulations apply here:
the proportions of polyamide units AB are in the range from 30 to 45 mol %,
the proportions of polyamide units AC are in the range from 30 to 40 mol %, and
the proportions of polyamide units D are in the range from 20 to 32 mol %,
wherein the sum total of polyamide units AB, AC and D is 100 mol %.

It is found that polyamide moulding compounds made from this copolyamide can overcome the disadvantages of the transparent moulding compounds known from the prior art and can provide good thermomechanical properties with a good transparency, and in particular are also stable with respect to frequent contact with steam at a temperature of 100° C., namely experiencing only little hazing, if any, and/or forming only few hairline cracks, if any. Accordingly, such mouldings are not only suitable for the kitchen sector and for use in dishwashers, but are also suitable for food processors employing steam treatment.

It is found in particular that these properties can only be achieved in the precise case that the long-chain aliphatic dicarboxylic acids are present as structural units in addition to the long-chain lactams or α,ω-aminocarboxylic acids, in combination with at least one cycloaliphatic diamine and at least one aromatic dicarboxylic acid. If one of these structural units is omitted, the properties cannot be achieved. Furthermore, if the components are not used in the claimed proportions, the properties can likewise not be achieved, as will be demonstrated hereinbelow on the basis of the exemplary embodiments.

The transparency of a plate produced from the transparent moulding compound and having a thickness of 2 mm, measured as light transmittance in accordance with ASTM D1003, is preferably above 90%, especially preferably at least 92%, and the haze is preferably at most 5%, especially preferably at most 3%. For the desired use of the moulding compounds according to the invention, stiffnesses (tensile modulus of elasticity greater than 1500 MPa) and high toughnesses (preferably impact resistance at 23° C. and −30° C.: no fracture) are achieved.

The value for light transmittance, which is used as a measure for the transparency, in context of the present application is always to be understood as being determined in accordance with the ASTM D1003:2013 (CIE-C illuminant) method. In the experiments performed below the measurement of the light transmittance was conducted on a Haze Guard Plus instrument from BYK Gardner (DE) on 70×2 mm discs or plates with dimensions of 60×60×2 mm. The transmittance is given for the visible wavelength range defined according to CIE-C, that is to say with significant intensities approximately between 400 and 770 nm. The 70×2 mm discs or 60×60×2 mm square plates are produced for this purpose for example on an Arburg injection moulding machine in a polished mould, with a cylinder temperature of between 200° C. and 340° C. and a mould temperature of between 20° C. and 140° C.

According to a further preferred embodiment, the copolyamide has a glass transition temperature (Tg) of 150° C. to 200° C., particularly preferably of 160° C. to 180° C.

A first preferred embodiment of the polyamide moulding compound is characterized in that the sum total of aliphatic polyamide units AC and D is in the range from 55-65 mol %, preferably in the range from 58-64 mol %. It is found that the specific choice of the aliphatic units within this range in particular increases the resistance to steam at high temperature.

Preferably, the proportions of polyamide units AB are in the range from 35-45 mol %, preferably in the range from 36-42 mol %.

Further preferably, the proportions of polyamide units AC are in the range from 31-38, preferably in the range from 32-35 mol %.

According to a further preferred embodiment, the proportions of polyamide units D are in the range from 22-31, preferably in the range from 25-30 mol %.

Particularly good properties for the polyamide moulding compound are obtained when the copolyamide AB/AC/D is amorphous and when (A) is selected as exclusively bis(4-amino-3-methylcyclohexyl)methane (MACM). In the context of the invention, amorphous means that the copolyamide has an enthalpy of fusion, determined in accordance with ISO 11357-3 (2012), of less than or equal to 3 J/g.

(B) is preferably selected as a mixture of isophthalic acid (I) and terephthalic acid (T). The ratio of isophthalic acid (I) to terephthalic acid (T) is preferably in the range from 40:60 to 60:40, and especially preferably in the range from 45:55 to 55:45. The two structural units are typically used essentially in a ratio of 1:1.

As mentioned, it is important for the achievement of the effects that a long-chain dicarboxylic acid is used. Particularly good properties can be obtained when (C) is selected exclusively from dodecanedioic acid.

It is further preferable for (C) to be selected exclusively from dodecanedioic acid and for (D) to be selected exclusively from laurolactam (LC 12).

Particularly stable properties can be obtained when the copolyamide is composed exclusively of the polyamide units AB/AC/D. As mentioned above, it should be taken into account here that this is to be understood as the short form, and if for example two different cycloaliphatic diamines are used for (A), the structure A'B/A"C/D present exclusively as the short form thus also encompasses the system which is actually present with the following polyamide units: A'B/A'C/A"B/A"C/D.

A very particularly preferred embodiment of the polyamide moulding compound has the following structure: MACMT/MACMI/MACM12/12, i.e. is formed exclusively from MACM, terephthalic acid, isophthalic acid, dodecanedioic acid and laurolactam. The polyamide units in this case are preferably distributed as follows, the percentages being mole percentages and adding up to 100%:

MACMT/MACMI/MACM 12/12: 17-22%/17-22%/31-36%/24-31%.

For many applications, such a polyamide moulding compound can be, and typically is, admixed in addition with the additives required for adjusting the properties. The polyamide moulding compounds according to the invention may therefore include the customary additives in the typically low proportions such as for example of less than 15% by weight, preferably less than 10% by weight, especially preferably less than 0.1-5.0% by weight. Accordingly, the present invention in a further preferred embodiment relates to such a polyamide moulding compound which is composed of 85-100% by weight, preferably 90-100% by weight, especially preferably 95.0-99.9% by weight, of copolyamide formed at least from the polyamide units AB/AC/D as set out above; 0-15% by weight, preferably 0-10% by weight, especially preferably 0.1-5.0% by weight, of additives, preferably selected from the group: polyamides different from the copolyamide AB/AC/D according to the invention; UV stabilizers; heat stabilizers; free-radical scavengers; processing aids; inclusion inhibitors; lubricants; mould release aids, including metal stearates or metal montanates, in which the metal is preferably selected from the group consisting of magnesium, calcium, barium; mineral oils or fatty acid amides; antifoams; plasticizers; functional additives for influencing the optical properties, especially the refractive index; impact modifiers; fillers and/or admixtures; optical brighteners; dyes or mixtures thereof, wherein the fillers and/or admixtures are preferably nanoscale and/or are selected from the following group: glass fibres, glass beads, carbon fibres, carbon black, graphite, flame retardants, minerals including titanium dioxide, calcium carbonate or barium sulfate, or mixtures thereof.

Preferred polyamides different from the copolyamide AB/AC/D according to the invention are PA11, PA12, PA 610, PA612, PA614, PA616, PA1010, PA1012, PA1014 and PA1016, and particular preference is given to PA12.

Preferred impact modifiers come from the group selected from acid-modified or acid anhydride-modified ethylene-α- olefin copolymers, ethylene-glycidyl-methacrylic acid copolymers and methacrylate-butadiene-styrene copolymers.

Filler or reinforcing agents can thus also be added to the moulding compounds according to the invention. In this case, the mouldings produced from the moulding compounds are naturally not necessarily transparent. Reinforcing agents that can be used, alongside glass fibres and carbon fibres, are particularly those based on renewable raw materials and on biocontents above 50%. It is particularly preferable to use natural fibres, e.g. cellulose fibres, hemp fibres, flax fibres, cotton fibres, wool fibres or wood fibres.

Preferably, however, such a polyamide moulding compound does not include any additives in the form of particulate and/or fibrous fillers and/or admixtures.

The present invention additionally relates to a process for preparing a polyamide moulding compound as described above, wherein this process is preferably characterized in that the copolyamide formed at least from the polyamide units AB/AC/D is prepared in pressure vessels, with a pressure phase at 270° C. to 330° C. with a subsequent expansion at 260° C. to 320° C., with a subsequent degassing at 260° C. to 320° C. and discharge of the polyamide moulding compound in the form of strands, cooling, pelletizing and drying of the pelletized material, optionally compounding with additives as pelletized material and forming in an extruder at melt temperatures of 250° C. to 350° C. to form a strand, chopping using suitable pelletizers to give pellets.

Preferably, the copolyamides according to the invention have a solution viscosity ($\eta_{nel}$) determined on solutions of 0.5 g of polymer in 100 ml of m-cresol in accordance with ISO 307 (2013) at 20° C. of between 1.5 and 2.5, particularly preferably of between 1.6 and 2.0 and very particularly preferably of between 1.65 and 1.85.

To set the desired relative viscosity, measured in a solution of 0.5 g of polymer in 100 ml of m-cresol at 20° C., it is possible to use either the diamine or the dicarboxylic acids in a slight excess of 0.01 to 3 mol %. The regulation process preferably uses from 0.01% to 2.0% by weight, preferably 0.05% to 0.5% by weight, of monoamine or monocarboxylic acids. Suitable regulators are benzoic acid, acetic acid, propionic acid, stearylamine or mixtures thereof. Particular preference is given to regulators containing amine or carboxylic acid groups and additionally containing stabilizer groups of HALS type or of tert-butylphenol type, such as for example triacetonediamine or isophthalic acid-ditriacetonediamine derivatives. Particular preference is given to regulating viscosity with a combination of diamine excess and monocarboxylic acid.

Suitable catalysts for accelerating the polycondensation reaction are phosphorus-containing acids, such as $H_3PO_2$, $H_3PO_3$, $H_3PO_4$, their salts or organic derivatives, where these simultaneously reduce discoloration during processing. The amounts added of the catalysts are in the range from 0.01% to 0.5% by weight, preferably in the range from 0.03% to 0.1% by weight. Suitable antifoams for avoiding foaming during the degassing process are aqueous emulsions which comprise amounts in the range from 0.001% to 1.0% by weight, preferably in the range from 0.01% to 0.10% by weight, of silicones or silicone derivatives, for a 10% emulsion.

Amounts of from 0.01% to 0.5% by weight of suitable heat stabilizers or of suitable UV stabilizers can already be added to the mixture prior to the polycondensation process. It is preferable to use high-melting-point types. It is particularly preferable to use Irganox 1098. The present invention additionally relates to mouldings made from such a polyamide moulding compound. In particular, the invention relates to a steam-resistant, transparent moulding, made from a polyamide moulding compound or having at least one region made from a polyamide moulding compound as described above, preferably produced by means of injection moulding processes and/or injection-compression moulding processes at melt temperatures of 230° C. to 320° C., wherein the mould is adjusted to temperatures of 40° C. to 130° C. and wherein optionally the mould at temperatures of 40° C. to 130° C. after filling of the cavity applies compression to the hot moulding.

An expansion-injection-compression moulding process is a particularly suitable process for producing defect-free, low-stress surfaces of the moulding made from the transparent polyamide moulding compounds according to the invention, such as for example lenses for spectacles or high-value casing parts, in which process cavities having wall thicknesses of 1 to 5 mm are filled and then, while filling continues, the mould cavity is enlarged to greater wall thicknesses.

Suitable processes for producing films, tubes and semi-finished products of monolayer or multilayer design from the transparent polyamide moulding compounds according to the invention include extrusion processes on single-screw or multi-screw extruders using melt temperatures of between 250° C. to 350° C., in which, depending on the compatibility of the different layers, suitable adhesion promoters in the form of appropriate copolymers or blends may be used.

Mouldings can be bulk-dyed or coloured subsequently by means of what are known as dip baths. Optional mechanical working of mouldings uses milling, drilling, grinding, laser marking, laser cutting and/or laser welding.

Mouldings of this kind are especially preferably characterized in that they have a resistance to more than 700, preferably more than 1000, steam cycles.

Such a moulding may preferably be a conduit or a container, preferably for contact with water and/or steam. Especially preferably, it is a conduit or a container in process technology (including heating technology), in food technology, especially a container for the production and/or processing and/or heating of foods, preferably in the baby and/or infant food sector.

A moulding of this kind is preferably characterized by a light transmittance, measured in accordance with ASTM D1003 (2013), determined on plates having dimensions of 2×60×60 mm or on discs having dimensions of 2×70 mm, at a temperature of 23° C., using a Haze Gard Plus measurement instrument from Byk Gardner using CIE illuminant C, the light transmittance being at least 88%, preferably at least 90% and particularly preferably at least 92%.

Lastly, the present invention also relates to the use of such a moulding as a part of a domestic appliance, especially a food container or a part thereof, especially as a part of a kitchen appliance, especially for the production and/or processing and/or heating of foods using steam.

Further embodiments are specified in the dependent claims.

BRIEF DESCRIPTION OF THE DRAWINGS

Preferred embodiments of the invention are described below on the basis of the drawings, which serve merely for elucidation and are not to be interpreted as limiting. In the drawings.

DESCRIPTION OF PREFERRED EMBODIMENTS

Figure 1:
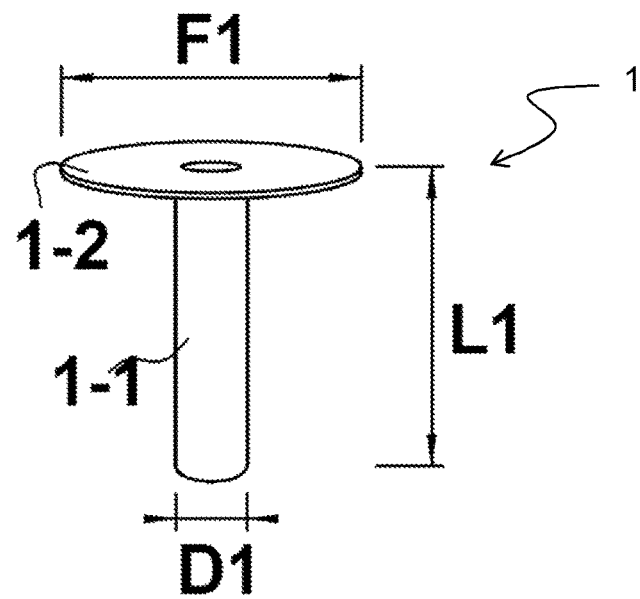
FIG. 1 shows a moulding for determining the steam resistance.

Preferred embodiments of the invention are described below on the basis of the exemplary embodiments, which serve merely for elucidation and are not to be interpreted as limiting. The transparent copolyamides according to the invention are prepared in a manner known per se in known stirrable pressure autoclaves having a reservoir vessel and a reaction vessel:

The reservoir vessel is initially charged with deionized water (25% by weight based on the mixture in Table 1) and the monomers and additives are added. This is followed by repeated inertization with nitrogen gas. The mixture is heated to 180 to 230° C. while stirring under the pressure which is established in order to obtain a homogeneous solution. This solution is pumped through a sieve into the reaction vessel, in which it is heated up to the desired reaction temperature of 260 to 350° C. at a pressure of not more than 30 bar. The mixture is kept at the reaction temperature in the pressure phase for 2 to 4 hours. In the subsequent expansion phase, the pressure is reduced to atmospheric pressure within 1 to 2 hours, in the course of which the temperature can fall slightly.

In the subsequent degassing phase, the mixture is kept at a temperature of 270 to 350° C. for 0.5 to 1 hour at atmospheric pressure. The polymer melt is discharged in the form of strands, cooled down in a water bath at 15 to 80° C. and pelletized. The pelletized material is dried at 80 to 120° C. for 12 hours under nitrogen or under reduced pressure to a water content of less than 0.1% by weight.

The following monomers are used to prepare the copolyamides described in the examples and comparative examples.

3,3'-Dimethyl-4,4'-diaminodicyclohexylmethane (MACM): freezing range according to ASTM D1015-55: −7 to −0.6° C.; manufacturer: BASF AG, Germany.

Dodecanedioic acid (DDS): melting range: 128 to 132° C.; manufacturer: Invista Nederland B.V., the Netherlands.

Isophthalic acid (IPS): melting range: 345 to 348° C.; manufacturer: Flint Hills Resources, Switzerland.

Terephthalic acid (TPS): melting range: >400° C.; manufacturer: BP Amoco Chemical Company, USA.

Laurolactam (LL): melting range: 149 to 153° C.; manufacturer: EMS-CHEMIE AG, Switzerland In addition, approximately 0.15% by weight of benzoic acid was used as chain regulator and approximately 0.01% by weight of Antifoam RD was used as antifoam (10% by weight emulsion, Dow Corning S.A., Belgium), the concentrations in each case being based on the mixture in Table 1.

The measurements were performed in accordance with the following standards and on the following test specimens.

Tensile Modulus of Elasticity:
   ISO 527 (2012) with a pulling speed of 1 mm/min;
   ISO tensile specimen, standard: ISO/CD 3167, A1 type, 170×20/10×4 mm; temperature 23° C.

Breaking strength and elongation at break:
   ISO 527 (2012) with a pulling speed of 50 mm/min;
   ISO tensile specimen, standard: ISO/CD 3167, A1 type, 170×20/10×4 mm; temperature 23° C.

Charpy Notched Impact Resistance:
   ISO 179/*eA (*2=instrumented) (2011); ISO test specimen, standard: ISO/CD 3167, B1 type, 80×10×4 mm; temperature 23° C.

Glass Transition Temperature (Tg), Melting Point and Heat of Fusion:
   ISO standard 11357-1, 11357-2, 11357-3 (2013); pelletized material; the differential scanning calorimetry (DSC) was carried out using a DSC 2920 instrument from TA Instruments with a heating rate of 20 K/min and a cooling rate of 5 K/min. The thermogram was analysed using the Universal Analysis 2000 program from TA Instruments. The sample was quenched in dry ice after the first heating run for the purpose of determining the glass transition temperature. The glass transition temperature (Tg) was determined on the second heating run. The midpoint of the glass transition range, which was reported as the glass transition temperature (Tg), was ascertained by the "half-height" method.

Transparency:
   ASTM D 1003 (2013); 70 mm disc or 60×60 mm plate, 2 mm thickness, temperature 23° C.; Haze Gard plus measuring instrument from Byk Gardner using CIE illuminant C. The light transmittance value is reported as % of the amount of incident light.

Relative Viscosity:
   ISO 307 (2007); 0.5 g in 100 ml of solvent in m-cresol; temperature 20° C.; calculation of the relative viscosity (RV) according to $RV=t/t_0$ in accordance with Section 11 of the standard.

HDT A (1.8 M Pa) and HDT B (0.45 M Pa):
   ISO 75; ISO impact specimen, 80×10×4.

Figure 2:
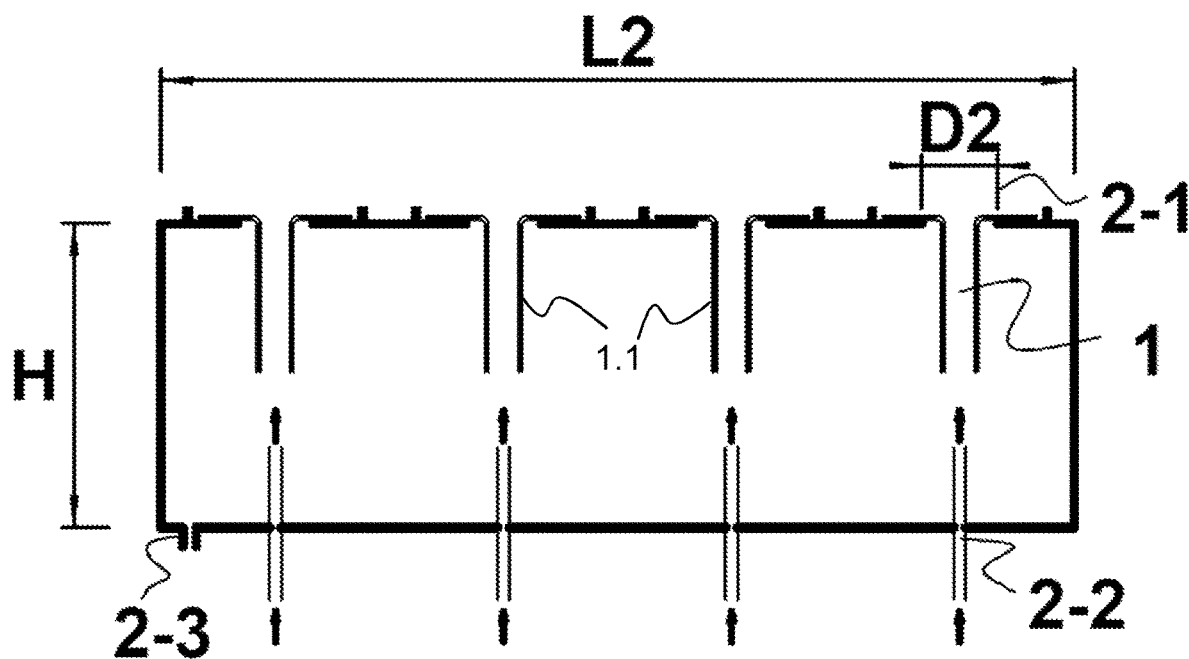
FIG. 2 shows a device for determining the steam resistance.

Steam Resistance (Ability to Withstand Steam Cycles):
   The mouldings 1, tubular pieces with a flange at one end (cf. FIG. 1), are produced by injection moulding from the materials described and have the dimensions given as follows: tube length L1=100 mm, internal diameter of tube D1=20 mm, wall thickness of tube and flange W=2 mm, flange diameter F1=100 mm, radius between tube and flange=5 mm. For the test, 4 mouldings are placed from above into the openings of the device for determining the steam resistance 2 (cf. FIG. 2), so that the tube 1-1 protrudes into the interior of the device and the flange 1-2 bears centrally on the outer side with respect to the opening 2-1 (diameter of the opening D2=50 mm). In order for the mouldings to keep this position during the test, guide elements are fitted to the upper side of the test apparatus. One steam introduction pipe 2-2 per moulding protrudes into the apparatus from below and is positioned vertically below the moulding in a central position at a distance of 5 cm. The supply of steam is controlled by valves. The device for determining the steam resistance 2 has the external dimensions 60×20×15 (L2×H×T) cm.

During the first part of the test, the steam treatment, the mouldings are exposed to a stream of steam with a temperature of 100° C. for 75 minutes. The stream of steam of a steam supply pipe in this case is 0.3 g/min. Condensed steam can flow away via an opening 2-3 in the lower part of the test apparatus, while the uncondensed fraction of the steam can escape through the openings in the mouldings.

After 75 minutes of steam treatment, the supply of steam is halted and the mouldings are allowed to cool down for a period of 75 minutes. The ambient temperature here is 23° C. and the relative air humidity is 60%.

After the cooling phase has ended, the new cycle begins again with the exposure of the mouldings to steam.

In the course of the test, the mouldings are assessed visually for the formation of hairline cracks. Hairline cracks form in particular on the tube close to the steam supply pipe and in the region of the transition to the flange. The table lists the respective number of test cycles at which hairline cracks were first observed on the moulding. If the mouldings do not exhibit any hairline cracks even after 1001 cycles, the test is terminated.

The test specimens are produced on an Allrounder 420 C 1000-250 model injection moulding machine from Arburg. Cylinder temperatures of between 230 and 320° C. are used here. The mold temperature is 80° C. Polished moulds are used for the plates for the transmittance measurement and the mouldings for the determination of the steam resistance.

Table 1 presented below compares the examples according to the invention (E1 and E2) with the comparative examples (CE1-CE4).

TABLE 1

|  | Unit | E1 | E2 | CE1 | CE2 | CE3 | CE4 |
|---|---|---|---|---|---|---|---|
| Reactants | | | | | | | |
| TPS | g | 6196 | 7200 | 13671 | 4652 | 8314 | 3520 |
| IPS | g | 6196 | 7200 | 7595 | 11048 | 8314 | 8810 |
| DDS | g | 16218 | 15500 | 0 | 18540 | 11034 | 14650 |
| LL | g | 11924 | 10425 | 25634 | 0 | 11002 | 15350 |
| MACM | g | 34972 | 36700 | 30913 | 41706 | 35288 | 32830 |
| Structural units | | | | | | | |
| MACMT | mol % | 18.15 | 20.96 | 31.91 | 16 | 24.56 | 9.83 |
| MACMI | mol % | 18.15 | 20.96 | 17.73 | 38 | 24.56 | 24.59 |
| MACM12 | mol % | 34.28 | 32.54 | 0 | 46 | 23.51 | 29.5 |
| 12 | mol % | 29.41 | 25.55 | 50.37 | 0 | 27.36 | 36.08 |
| MACMT + MACMI | mol % | 36.3 | 41.92 | 49.64 | 54 | 49.12 | 34.42 |
| MACM12 + 12 | mol % | 63.69 | 58.09 | 50.37 | 46 | 50.88 | 65.58 |
| Properties | | | | | | | |
| Tg | ° C. | 170 | 174 | 169 | 203 | 185 | 162 |
| HDT B | ° C. | 153 | 157 | 150 | 189 | 175 | 139 |
| HDT A | ° C. | 133 | 136 | 136 | 162 | 146 | 125 |
| Modulus of elasticity | MPa | 1900 | 2000 | 2000 | 2130 | 2000 | 1930 |
| Breaking strength | MPa | 74 | 76 | 79 | 78 | 80 | 76 |
| Elongation at break | % | 120 | 115 | 90 | 91 | 72 | 115 |
| Notched impact resistance | kJ/m$^2$ | 12 | 12 | 11 | 12 | 11 | 10 |
| Transparency | % | 93.5 | 93.5 | 92.5 | 93.2 | 93.2 | 93.3 |
| Steam cycles | | >1000 | >1000 | 530 | 570 | 620 | 680 |
| Relative viscosity | | 1.72 | 1.70 | 1.67 | 1.60 | 1.64x | 1.74x |

It can be seen from the examples and the comparative examples that the good combination of (thermo)mechanical properties (in particular good values for HDT, modulus of elasticity and elongation at break, and also notched impact resistance) and good ability to withstand steam cycles can only be achieved for the polyamide moulding compounds according to the invention. In particular, a comparison with CE1 shows that dodecanedioic acid (or corresponding long-chain diacids as claimed) is crucial as a structural unit, and a comparison with CE2 shows that laurolactam (or corresponding long-chain lactams as claimed) is crucial as a structural unit. Without these structural units, the properties of the invention cannot be achieved. In addition, a comparison with CE3 and with CE4 shows that the specific setting of the proportions is crucial. For instance (compare CE3), a moulding compound with too little dodecanedioic acid and too much aromatic dicarboxylic acids cannot ensure the ability to resist steam cycles. Furthermore, a comparison with CE4 shows that an excessively high proportion of aliphatic blocks likewise does not display sufficient ability to resist steam cycles.

The examples, in comparison with the comparative examples, therefore show that the individual polyamide units or structural units are critically responsible for ensuring the vital properties, and that the proportions are only permissible within the scope of the narrow ranges claimed in order to also effectively provide the vital properties.

LIST OF REFERENCE SYMBOLS

| 1 | Moulding for determining the steam resistance | D1 | Internal diameter of 1-1 |
|---|---|---|---|
| 1-1 | Tube of 1 | F1 | Diameter of 1-2 |
| 1-2 | Flange of 1 | L1 | Length of 1 |
| 2 | Device for determining the steam resistance | W | Wall thickness of 1-1 |
| | | D2 | Diameter of 2.1 |
| | | H | Height of 2 |

-continued

LIST OF REFERENCE SYMBOLS

| 2-1 | Opening in 2 for 1 | L2 | Length of 2 |
|---|---|---|---|
| 2-2 | Steam introduction pipe | | |
| 2-3 | Drainage opening | | |

The invention claimed is:

1. A polyamide moulding compound comprising at least one copolyamide formed from at least the polyamide units AB/AC/D,
wherein:
(A) is at least one cycloaliphatic diamine selected from the group consisting of: bis(4-amino-3-methylcyclohexyl) methane (MACM) and bis(4-aminocyclohexyl) methane (PACM);
(B) is at least one aromatic dicarboxylic acid selected from the group consisting of: isophthalic acid (I), naphthalenedicarboxylic acid, and terephthalic acid (T);
(C) is at least one aliphatic dicarboxylic acid selected from the group consisting of: decanedioic acid, undecanedioic acid, dodecanedioic acid, tridecanedioic acid, tetradecanedioic acid, pentadecanedioic acid, and hexadecanedioic acid; and (D) is at least one lactam or α,ω-aminocarboxylic acid selected from the group consisting of: laurolactam (LC 12), undecanolactam (LC 11), 12-aminododecanoic acid, and 11-aminoundecanoic acid;

wherein:

the proportions of polyamide units AB are in the range from 30 to 45 mol %, the proportions of polyamide units AC are in the range from 30 to 40 mol %, and the proportions of polyamide units D are in the range from 20 to 32 mol %, and wherein the sum total of polyamide units AB, AC and D is 100 mol %.

2. The polyamide moulding compound according to claim 1, wherein the sum total of aliphatic polyamide units AC and D is in the range from 55-65 mol %, and the proportions of polyamide units AB are in the range from 35-45 mol %.

3. The polyamide moulding compound according to claim 1, wherein the sum total of aliphatic polyamide units AC and D is in the range from 58-64 mol %, and the proportions of polyamide units AB are in the range from 36-42 mol %.

4. The polyamide moulding compound according to claim 1, wherein the proportions of polyamide units AC are in the range from 31-38 mol %, and/or wherein the proportions of polyamide units D are in the range from 22-31 mol %.

5. The polyamide moulding compound according to claim 4, wherein the proportions of polyamide units AC are in the range from 32-35 mol %, and/or wherein the proportions of polyamide units D are in the range from 25-30 mol %.

6. The polyamide moulding compound according to claim 1, wherein (A) is exclusively bis(4-amino-3-methylcyclohexyl) methane (MACM).

7. The polyamide moulding compound according to claim 1, wherein (B) is a mixture of isophthalic acid (I) and terephthalic acid (T).

8. The polyamide moulding compound according to claim 7, wherein the molar ratio of isophthalic acid (I) to terephthalic acid (T) is in the range from 40:60 to 60:40.

9. The polyamide moulding compound according to claim 7, wherein the molar ratio of isophthalic acid (I) to terephthalic acid (T) is in the range from 45:55 to 55:45.

10. The polyamide moulding compound according to claim 1, wherein (C) is exclusively dodecanedioic acid.

11. The polyamide moulding compound according to claim 1, wherein (D) is exclusively laurolactam (LC 12).

12. The polyamide moulding compound according to claim 1, wherein the copolyamide is composed exclusively of the polyamide units AB/AC/D.

13. The polyamide moulding compound according to claim 1, wherein it is composed of:

85-100% by weight of the at least one copolyamide formed from at least the polyamide units AB/AC/D; and 0-15% by weight of additives.

14. The polyamide moulding compound according to claim 1, wherein it is composed of:

95.0-99.9% by weight, of the at least one copolyamide formed from at least the polyamide units AB/AC/D; and 0.1-5.0% by weight of additives.

15. The polyamide moulding compound according to claim 1, wherein it is composed of:

85-100% by weight, of the at least one copolyamide formed from at least the polyamide units AB/AC/D; and 0-15% by weight of additives, selected from the group consisting of: polyamides different from the at least one copolyamide formed from at least the polyamide units AB/AC/D; UV stabilizers; heat stabilizers; free-radical scavengers; processing aids; inclusion inhibitors; lubricants; mould release aids; mineral oils; fatty acid amides; antifoams; plasticizers; functional additives for influencing the optical properties; impact modifiers; fillers; filler admixtures; optical brighteners; dyes; and mixtures thereof.

16. The polyamide moulding compound according to claim 15, wherein the additives do not contain any fillers or filler admixtures.

17. The polyamide moulding compound according to claim 15, wherein the mould release aids are metal stearates or metal montanates, wherein the metal is selected from the group consisting of magnesium, calcium, and barium.

18. The polyamide moulding compound according to claim 15, wherein the functional additives for influencing the optical properties are for influencing the refractive index.

19. The polyamide moulding compound according to claim 15, wherein the fillers and filler admixtures are optionally nanoscale and are selected from the group consisting of glass fibres, glass beads, carbon fibres, carbon black, graphite, flame retardants, minerals, and mixtures thereof.

20. The polyamide moulding compound according to claim 19, wherein the minerals are selected from the group consisting of titanium dioxide, calcium carbonate, and barium sulfate.

21. A process for preparing a polyamide moulding compound according to claim 1, comprising: preparing the at least one copolyamide formed from at least the polyamide units AB/AC/D in pressure vessels, with a pressure phase at 180° C. to 330° C., with a subsequent expansion at 260° C. to 350° C., and with a subsequent degassing at 270° C. to 350° C.; discharging the at least one copolyamide in the form of strands; cooling the strands; pelletizing the cooled strands; drying of the pelletized material; and optionally compounding the pelletized material with additives in an extruder at melt temperatures of 250° C. to 350° C. to form a strand, which is chopped by a pelletizer to give pellets.

22. A process for preparing a polyamide moulding compound according to claim 1, comprising: preparing the at least one copolyamide formed from at least the polyamide units AB/AC/D in pressure vessels, with a pressure phase at 270° C. to 330° C., with a subsequent expansion at 260° C. to 320° C., and with a subsequent degassing at 260° C. to 320° C.; discharging the at least one copolyamide in the form of strands; cooling the strands; pelletizing the cooled strands; drying of the pelletized material; and optionally compounding the pelletized material with additives in an extruder at melt temperatures of 250° C. to 350° C. to form a strand, which is chopped by a pelletizer to give pellets.

23. A moulding having at least one region made from the polyamide moulding compound according to claim 1.

24. The moulding according to claim 23, which is transparent and steam-resistant.

25. The moulding according to claim 23, which is produced by injection moulding processes and/or injection-compression moulding processes at melt temperatures of 230° C. to 320° C.; wherein the mould is adjusted to temperatures of 40° C. to 130° C.; and wherein compression is optionally applied to the molding in the mould at temperatures of 40° C. to 130° C. after filling of the mould cavity.

26. The moulding according to claim 25, which has a resistance to more than 700, or to more than 1000, steam cycles.

27. The moulding according to claim 25, which is in the form of a conduit or a container.

28. The moulding according to claim 25, which is suitable: for contact with water and/or steam in process technology, for use in food technology, or for use in the production and/or processing and/or heating of foods in the baby and/or infant food sector.

29. The moulding according to claim 25, which is suitable: for use as a food container or a part thereof, for use as a part of a kitchen appliance, or for use in the production and/or processing and/or heating of foods using steam.

* * * * *